(12) United States Patent
McGinn et al.

(10) Patent No.: US 6,590,131 B2
(45) Date of Patent: Jul. 8, 2003

(54) METHOD FOR CONTROL OF A CHEMICAL MANUFACTURING PROCESS

(75) Inventors: Dennis L. McGinn, Friendswood, TX (US); William D. Stephens, Alpharetta, GA (US); J. Andy Gray, Friendswood, TX (US); Betzy Janssen, St. Charles, IL (US); Gomer E. Stover, Alvin, TX (US); James A. Waltz, League City, TX (US); Ramaswamy Vaidyanathan, Aurora, IL (US); David R. Van Hare, Kansas City, MO (US); Jerome J. Marcec, Rosewell, GA (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 09/839,076

(22) Filed: Apr. 20, 2001

(65) Prior Publication Data

US 2002/0031045 A1 Mar. 14, 2002

Related U.S. Application Data

(60) Provisional application No. 60/200,092, filed on Apr. 27, 2000.

(51) Int. Cl.[7] .................. G05B 19/00; B01F 15/02; C07C 5/00
(52) U.S. Cl. ............. 585/501; 366/136; 366/151.1; 366/348; 422/105; 422/109; 422/111; 422/131; 526/59; 585/502; 700/268; 700/269
(58) Field of Search .............. 366/151.1, 152.1, 366/152.2, 348; 422/62, 131, 132, 133, 134, 135, 136, 137, 139, 105, 108, 109, 110, 111; 526/59, 60; 700/268, 269; 585/700, 956, 701; 702/32; 340/657

(56) References Cited

U.S. PATENT DOCUMENTS

| 3,266,873 | A |   | 8/1966  | Alleman et al.          |
|-----------|---|---|---------|--------------------------|
| 3,356,667 | A | * | 12/1967 | Smith et al.            |
| 3,614,682 | A | * | 10/1971 | Smith                   |
| 3,636,326 | A | * | 1/1972  | Smith et al.            |
| 4,404,640 | A |   | 9/1983  | Dumbeck et al.          |
| 4,491,924 | A | * | 1/1985  | Agarwal                 |
| 4,668,473 | A | * | 5/1987  | Agarwal ............ 422/132 |
| 5,065,336 | A | * | 11/1991 | Buchelli                |
| 5,209,607 | A | * | 5/1993  | Wei et al.              |
| 5,308,438 | A |   | 5/1994  | Cote et al. ........... 156/636 |
| 5,403,603 | A |   | 4/1995  | McCullough et al. ... 426/233 |
| 5,422,014 | A |   | 6/1995  | Allen et al. ........... 210/743 |
| 5,504,166 | A | * | 4/1996  | Buchelli et al. ........ 526/60 |
| 5,554,704 | A |   | 9/1996  | Burkhardt et al. ...... 526/153 |
| 6,012,019 | A | * | 1/2000  | Saby ..................... 702/32 |
| 6,144,897 | A | * | 11/2000 | Selliers ................. 700/269 |

FOREIGN PATENT DOCUMENTS

EP            0318609         7/1989

* cited by examiner

*Primary Examiner*—Joseph Drodge
(74) *Attorney, Agent, or Firm*—Scott P. McDonald

(57) ABSTRACT

A method for monitoring and improving the performance of a chemical manufacturing process by monitoring transients associated with the operation of process equipment located downstream of upstream equipment is disclosed. Transients on signals such as the motor current to downstream powder feeding equipment provide early indications of changes in chemical process performance which can then be corrected by altering chemical manufacturing process conditions.

25 Claims, 3 Drawing Sheets

METHOD FOR CONTROL OF A CHEMICAL MANUFACTURING PROCESS

CROSS REFERENCE TO RELATED APPLICATIONS

This application claims the benefit of provisional patent application Ser. No. 60/200,092, filed Apr. 27, 2000, entitled "Method and Apparatus for Monitoring and Control of a Chemical Reactor."

BACKGROUND OF THE INVENTION

Many chemical manufacturing processes employ chemical reactors to convert chemical feedstocks to desired solid, gaseous or liquid intermediates and end products. During the production of these desired materials, the materials pass through a wide variety of process equipment located downstream of the chemical reactor. This process equipment typically conveys, treats, reacts or otherwise operates on the intermediates, waste or recycle streams, or end products so that the desired end product is produced in the desired form for shipment to the end user.

An example of one such process is the gas phase production of polyolefins such as polypropylene or polyethylene from gaseous feedstocks. In this type of process, one or more gaseous monomer feedstocks reacts in the chemical reactor in the presence of a catalyst to produce a powdered polymer. The powdered polymer typically then is extruded in a finishing unit to produce pellets. These pellets are easy to ship, and are used to fabricate polymer-based manufactured products such as molded articles, films and fibers.

Under ideal circumstances, reactors such as the polymerization reactors discussed above will produce powdered product having a relatively predictable distribution of particle sizes. Downstream powder handling and finishing equipment is designed to accommodate this predicted distribution of particle sizes. Unfortunately, under less than ideal conditions, the polymerization reactor can produce "lumps" or "strings", which are agglomerates of polymer particles having a significantly greater size than expected.

The presence of strings and lumps can serve as an early indication that the polymerization reactor is not functioning optimally. Unfortunately, unless reactor performance is seriously degraded, the presence of strings and lumps often can not be observed directly. Additionally, the presence of strings and lumps in polymer powder is often masked by the pelletization process, in which the extruder operates under temperature and pressure conditions sufficient to pelltize some undesirably large particles.

Sub-optimal reactor performance as indicated by the presence of undesired large particles typically requires a change in reactor operating parameters to improve operations. Furthermore, while the product finishing process can, at times, force strings and lumps to take a macroscopic form desired by the end user (such as that of a pellet), the delivered material may contain substantial sub-macroscopic inhomogeneous regions (i.e. localized regions within the pellet) which may affect use of the delivered material by the end user.

In many cases, problems such as those noted above can be detected prior to delivery of product to a customer through various sampling and quality control programs. The use of such programs cannot, however, provide early, real time indication of sub-optimal process conditions that would enable the reactor operator to take corrective action to avoid or minimize the formation of inhomogeneous material.

On-line product analyzers can be used to provide information useful for process control to minimize product inhomogeniety in some cases, but on-line analyzers are not available to detect many types of undesirable product variations.

What is needed is a sensitive, real time method for indirectly monitoring the formation of intermediate and product inhomogeneity in a chemical manufacturing process, without having to resort to the addition of on-line product analysis equipment. The method should allow the chemical manufacturing process operator to intervene, manually or through automated control systems, to minimize or eliminate formation of inhomgeneous material. Such early detection and intervention would enable correction of process parameters in equipment such as the chemical reactor before major upsets in the chemical reactor or other equipment occurs, and before substantial amounts of off specification material are manufactured.

SUMMARY OF THE INVENTION

Surprisingly, we have found that by monitoring signals from downstream process equipment for subtle transient responses, we can detect the presence of nonhomogeneous products such as polymer strings, lumps and other abnormally large particles. We then use that information to take corrective action before the presence of these undesired products becomes pronounced enough to cause upsets in process equipment, and at a time earlier than would be apparent from direct observation of reactor or other upstream equipment operating parameters or from quality control samples.

Transients useful for early detection of undesirable changes in process conditions appear as relatively high frequency "spikes" having a relatively short duration and relatively high amplitude when compared to the low frequency variation of the process equipment signals seen under normal operating conditions.

The monitored signals are not a direct measure of the chemical or physical parameters of a desired chemical reaction product by an analytical instrument, such as a direct measurement of particle size, or measurement a side stream of process material to determine viscosity. Rather, the signals typically are those normally available from the operation of the process equipment.

Transients present on downstream process equipment signals can be used to infer changes in process performance where the material parameter in question can not, or can not easily, be measured, or where a material characteristic can not be measured directly or promptly measured by an on-line product analyzer.

For example, transients appearing on a signal representing motor current for a piece of downstream rotating equipment can serve as an indication that the equipment is working against the introduction of inhomogeneous product (such as a polymer lump) from an upstream source. These relatively short term transients are often well tolerated by the process and control equipment they are related to, causing no apparent operational effect. Oftentimes the existence of such transients will not even be apparent until after a deliberate effort is made to sense or observe the transients. Once the presence of such transients is identified, further investigation will show a correlation to product inhomogeneity, and the signals can then be monitored in accordance with the invention to provide early indication of the need for upstream process control.

In the foregoing example, our invention is a very sensitive and timely method to detect the presence of strings and lumps, because these larger particles pass through the reactor and often through the extruder with no observable effect until they become very large. Nevertheless, examination of the powder feeder motor current signal showed the presence of small spikes believed to be caused by small lumps lodging in a relatively small gap between a rotating feeder blade and its housing. This early indication of deteriorating process conditions allows control action to be taken at an early point in time, where the required change in control can be less severe and more easily accomplished.

In a first embodiment of our invention, we disclose a method for controlling a chemical manufacturing process in which we first monitor a signal associated with downstream process equipment to detect transients present in the signal. We then infer a change in product quality associated with the detected transients, and adjust an upstream equipment process parameter in response to the inferred change in product quality.

While the invention can be used to control upstream equipment when the material whose quality is being controlled is either a solid or a viscoelastic fluid, such as a polymer melt, the invention is particularly useful in connection with the manufacture of polymeric powders such as polypropylene and polyethylene. Upstream equipment process parameters that can be varied include catalyst feed, cocatalyst feed, electron donor feed, monomer feed, hydrogen feed, comonomer feed, catalyst to cocatalyst ratio, catalyst activity control agent feed, reactor quench flow, reactor powder inventory, reactor temperature and pressure, whether controlled directly or indirectly by altering other parameters, reactor stirring or fluidization, or by altering combinations of the foregoing.

The invention is particularly useful for providing indications of agglomerated powders when the signal monitored is indicative of the performance of powder handling equipment such as rotary powder feeders.

Preferred embodiments of the invention monitor electrical current, voltage or frequency signals, hydraulic pressure signals or pneumatic pressure signals, as these signals frequently will exhibit transients of the type that can be correlated to subtle changes in product quality.

As used in this application, the term "downstream process equipment" means equipment located downstream of a chemical reactor which is used in the production or finishing of a chemical product, including, for example, motorized equipment such as pumps, conveyors, feeders, extruders and the like, but excluding equipment designed for the direct measurement of physical or chemical parameters, such as gas chromatographs, on-line spectroscopy equipment, or side stream viscosity or melt flow analyzers. This definition does not, however, preclude the use of inferential information from a process analyzer, for example such as from the motor controller circuit of a pump used to provide sample to an in-line viscometer.

A "signal associated with downstream process equipment" can be any signal used to control or monitor the equipment. Thus, the term includes both controlled signals, such as motor current signals, or signals indicative of equipment condition, such as motor temperature, or equipment pressure or temperature.

A "process parameter associated with upstream equipment" means any parameter useful for controlling a piece of process equipment located at a point earlier ("upstream") in the chemical manufacturing process to control the quality or quantity of material produced at a point located before the downstream process equipment. Examples of such parameters are the control of flow of feedstocks or catalyst to a reactor, or control of cooling water to an upstream heat exchanger. Other examples will be readily apparent to those skilled in the chemical manufacturing art.

In another embodiment of our invention, the motor current of a rotary feeder or other powder-handling equipment located downstream of a polymerization reactor is monitored for transients that indicate the presence of particles of unusually large shape or size. The magnitude and frequency of these transients can be compared over time to determine the presence of nonhomogeneous reactor effluent that otherwise is difficult to detect. Corrective action can then be taken to minimize the production of the undesired material.

As used herein, the term "powder-handling equipment" means any equipment used to transport, treat or operate a powdered material. As such, powder-handling equipment includes, but is not limited to, powder-transfer lines and valves such as in blow case systems, powder feeders or conveyers, extruders and purge columns.

DESCRIPTION OF THE PREFERRED EMBODIMENT

The following description discusses the use of our invention in a polypropylene reactor system of modern design. The use of the invention in a polypropylene reactor system is exemplary only, as those skilled in the art will recognize that the invention is readily adapted to a wide variety of applications where quality of materials produced by a chemical reactor is difficult to observe directly.

Figure 1:
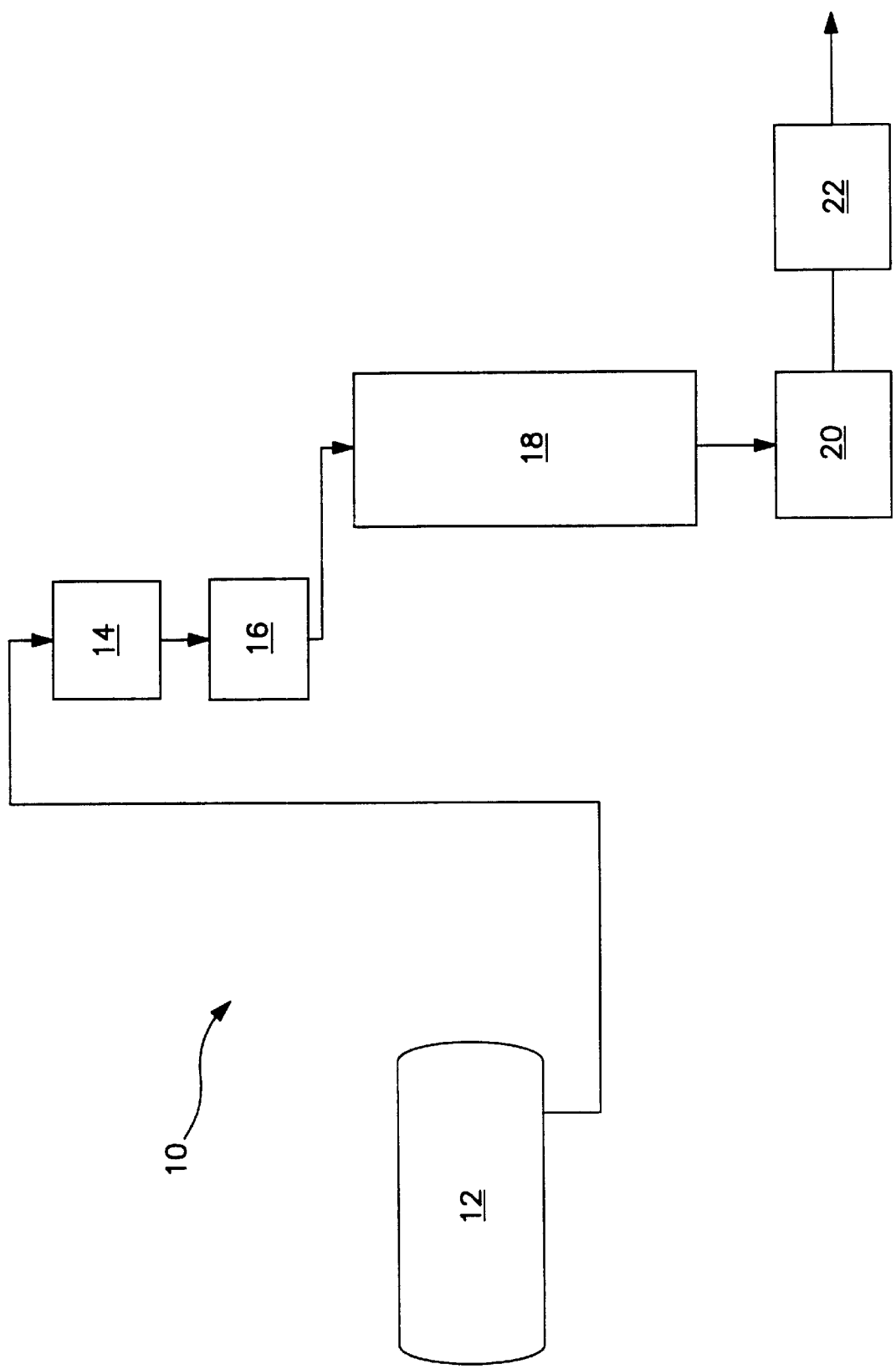
FIG. 1 is a schematic diagram of a polypropylene reactor system employing detection and control in accordance with the present invention.

FIG. 1 is a simplified schematic diagram of a polypropylene reactor system 10 in accordance with the present invention. System 10 can be used to produce homopolypropylene and random copolymers of propylene and ethylene. In its simplified form, the system includes a first polymerization reactor 12, an expansion bag filter 14, a rotary feeder 16, a purge column 18, a second rotary feeder 20, and a pelletizer 22.

Homopolypropylene can be produced in reactor 12 by feeding propylene, catalyst, and any desired cocatalyst and modifiers as is known in the art in to reactor 12.

Reactor 12 preferably is a horizontal reactor containing an agitator located coaxially within reactor 12. The vapor phase polymerization of polypropylene in such a reactor is described in detail in our U.S. Pat. No. 3,957,448 to Shepard, et al., U.S. Pat. No. 3,965,083 to Jezl, et al., U.S. Pat. No. 3,971,768 to Peters, et al. and U.S. Pat. No. 4,627,735 to Rose, et al., the disclosures of which are hereby incorporated in their entirety by reference.

In reactor 12, vapor phase polymerization occurs by an essentially isobaric process using any of a number of well-known high yield catalyst systems. Typical catalysts will be solid, transition metal-based materials supported on a metal oxide, halide or salt. Supported magnesium-containing, titanium halide-based catalyst systems are well known and preferred in many applications, and often used in connection with an aluminum alkyl cocatalyst. A preferred catalyst is the Amoco CD-brand catalyst available from BP Amoco Polymers, Inc. of Alpharetta, Ga.

The catalyst, cocatalyst and any desired modifiers such as silane-based materials are injected into the upstream end of reactor 12. The feed rates of the cocatalyst and the modifier are ratio-controlled to the catalyst feed according to manufacturing specifications, while the catalyst feed is regulated to achieve targeted production rate in the reactor.

Polymer particulates typically form around solid catalyst particles in reactor 12. In operation, reactor 12 typically is half-filled with polymer powder which is driven by a reactor agitator in a near plug flow-like manner toward a discharge end of reactor 12. The reactor agitator consists of a plurality of transversly oriented paddles connected to a longitudinally oriented drive shaft located coaxially within reactor 12.

Polymerization heat is removed from reactor 12 by evaporative cooling of recycled propylene liquid (quench liquid) that has been sprayed on the surface of the polymer powder bed formed in reactor 12. Unreacted propylene vapor leaves reactor 12 and is separated from any entrained fine polymer, collected, and sent back to reactor 12. Reactor vapor is partially condensed, gathered, and the liquid pumped back to reactor 12 to remove heat of polymerization. Fresh propylene makeup is added to this recycle stream, and uncondensed vapor is compressed and recycled back to reactor 12. Fresh hydrogen is added to this stream for molecular weight control based on a prescribed hydrogen to propylene molar ratio. The recycle gas is fed to the bottom of the reactor with the flow rate ratio-controlled to the propylene quench flow. For homopolymer production, propylene is the only monomer fed to the system. For random copolymer production, a relatively small and controlled amount of ethylene comonomer or is added to the propylene.

Polypropylene powder is removed from reactor 12 by a blowcase system (not shown). The blowcase system incorporates a cycling ball valve which opens for a few seconds three to four times every minute to permit polypropylene powder to be forced from reactor 12. Under nominal operating conditions, the polypropylene powder removed by the blowcase system typically has a mean particle size of about 500 to 600 microns, with a particle size distribution ranging from fines to about 1200 microns or so. Particles larger than 1200 microns are not preferred, and particles capable of producing transients in accordance with the invention will be those having a size sufficient to cause the downstream process control equipment to generate an observable transient.

The polymer powder discharged through the cycling ball valve is transferred to gas expansion bag filter 14, typically resulting in a pressure let down of from about a few hundred pounds per square inch to about 5 psig. Depressurized polymer powder fills a standpipe (see discussion of FIG. 2 below) located directly above a rotary feeder 16, which meters polymer powder into a purge column 18.

Steam and nitrogen are introduced into purge column 18 to deactivate catalyst and remove any residual gaseous hydrocarbon from the polymer powder. A second rotary feeder 20 then meters the purged polymer powder to pelletizer 22 for formation into polymer pellets.

Figure 2:
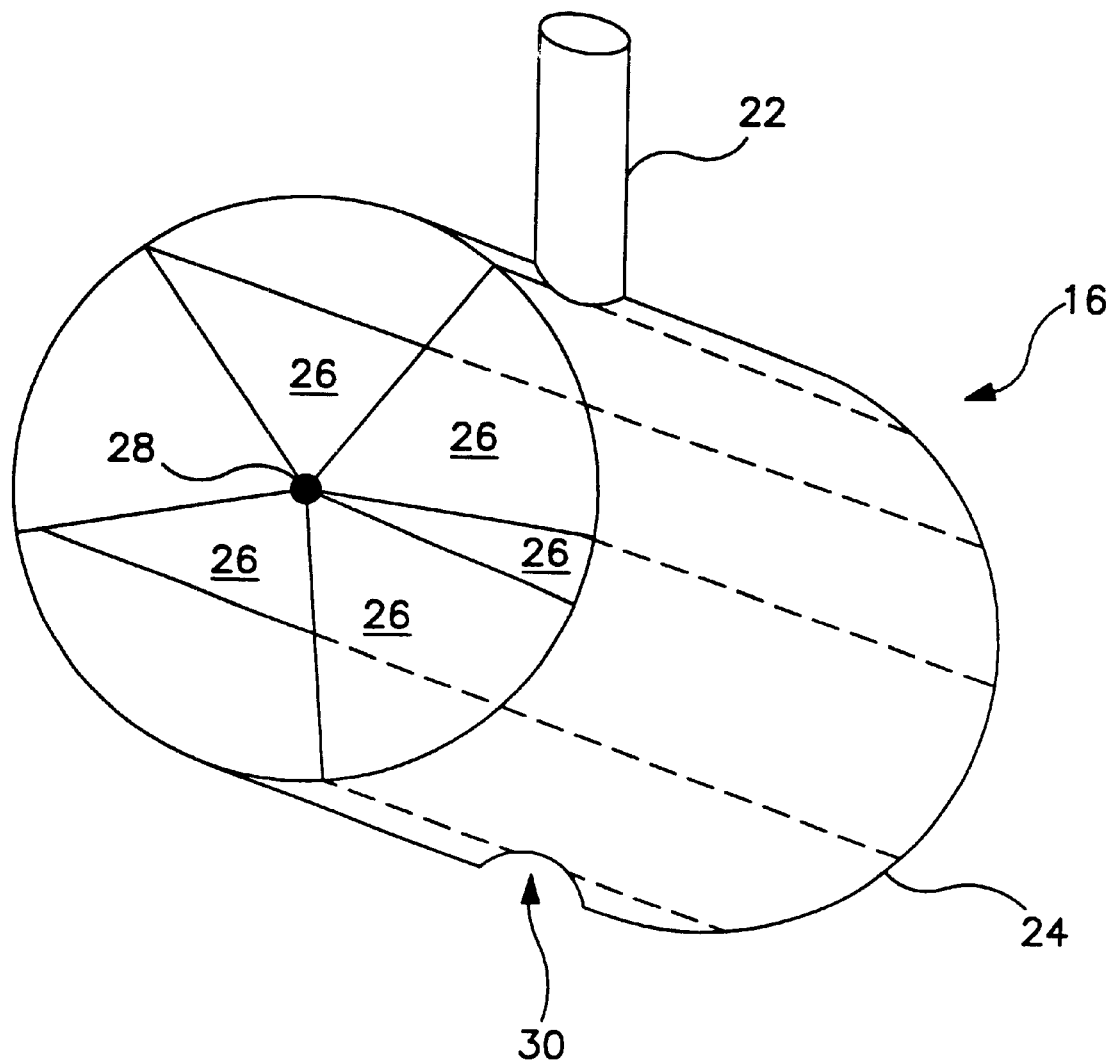
FIG. 2 is a perspective view of a rotary powder feeder as discussed in connection with our invention.

FIG. 2 shows additional detail of rotary feeder 16. Feeder 16 includes an aperture for receiving powder from a standpipe 22, a cylindrical body 24, a plurality of rotary paddles 26 mounted on a shaft 28, and a discharge aperture 30 which permits metered powder to enter purge column 18 (see FIG. 1). The open distance between the outer edges of paddles 26 and cylindrical body 24 is minimized to the extent possible to prevent gas from passing back through rotary feeder 16 into filter 14 (see FIG. 1). Preferably, vents (not shown) can be included in cylindrical body 24 so that gas entering the regions emptied by the deposition of powder in to purge column 18 can leave feeder 16 before the gas-filled region is exposed to fresh powder from standpipe 22.

Shaft 28 is turned by a motor (not shown) at a rate corresponding to the desired powder transfer rate. In accordance with the present invention, the presence of strings, or other abnormally large particles or lumps in polymer powder passing through feeder 16 can be detected by monitoring the shaft motor current required to maintain the feeder speed at the desired transfer rate. Any large particle or string of polymer having sufficient size to interfere with the smooth passage of powder through feeder 16 will cause a transient in shaft motor current as the motor controller attempts to maintain the desired feed speed in opposition to additional resistance caused by the string or lump opposing the motion of paddles 26. An increase in either the frequency or magnitude of the shaft motor current frequently will be the first indication that reactor operating conditions have deteriorated to the point where undesirably large particles are forming and require that the reactor operating conditions closer scrutiny and adjustment.

The invention is an extremely sensitive measure of reactor performance because small strings and lumps easily capable of moving out of the reactor and through the reactor powder handling system will nevertheless cause spikes in motor current to occur when stuck in the relatively small gap between a paddle 26 and cylinder wall, 28 thus providing an early indication of deteriorating reactor performance not otherwise able to be discerned by observing the reactor process operating parameters directly.

In an early embodiment of the invention, we monitored the transients in motor current by connecting a Gould Windograf 980 strip chart recorder to the variable frequency drive ("VFD") for rotary feeder 16's shaft motor. The signal from the variable frequency drive in this case was directly proportional to motor amperage. A process engineer manually noted how many times the strip chart recorder indicated transients in excess of twenty percent of the baseline motor amperage. This data was used as a direct indication of string and lump production. The data also was entered into an EXCEL spreadsheet having trending capabilities for further analysis. Steps were then taken in an attempt to minimize formation of undesired large particles.

Additional experience with monitoring the variable frequency drive signal led to introduction of the signal into the plant's distributed control system ("DCS") on a more sophisticated basis.

Figure 3:
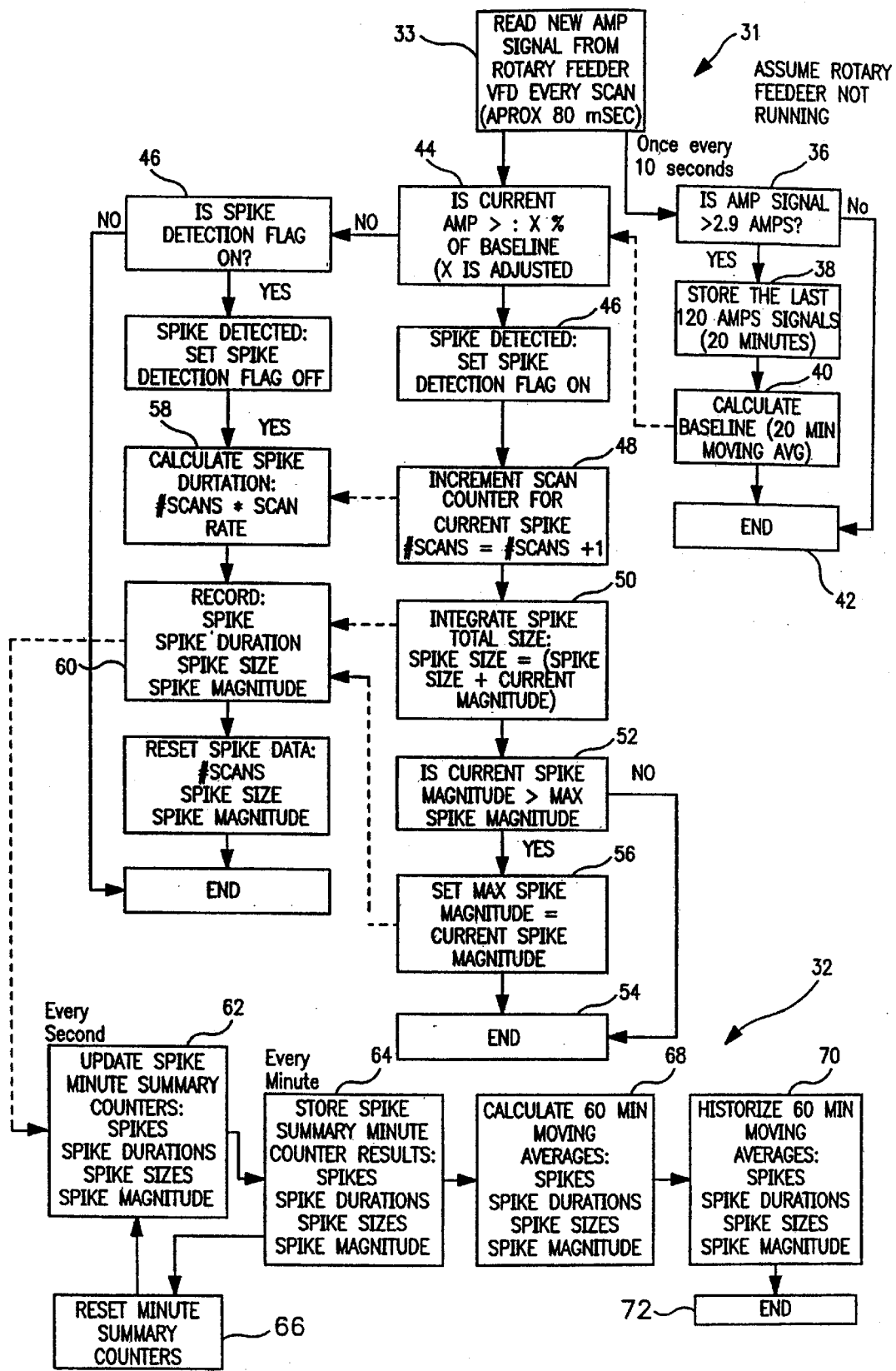
FIG. 3 is a flowchart of a spike detection and spike summary algorithm useful in implementing our invention.

FIG. 3 describes in greater detail the logic used to capture and analyze transients in motor current generated from rotary feeder 16.

The control logic generally includes a spike detection algorithm 31 and a spike summary algorithm 32.

Spike detection algorithm 31 begins by reading signals indicative of the rotary feeder motor current variable frequency drive every ten seconds at step 36. The purpose of this test is determine whether the motor current signal should be included in the 120 signals stored in step 38 which are subsequently used to calculate a moving baseline average motor current. The moving baseline is used elsewhere in spike detection algorithm 32 as discussed below. If the motor current signal indicates that the motor current is less than 2.9 amps, the value of the signal is not stored in step 38. Ignoring signals indicating a motor current of less than 2.9 amps prevents data points being included in the average from undesired events, such as when the feeder is stopped or operated in reverse mode. This filter prevents zero or negative numbers from being stored in step 38 by terminating this branch of the algorithm at step 42.

As each new value indicating a motor current greater than 2.9 amps is detected, it is stored in step 38. The storage of each new value causes the "oldest" of the 120 data points stored at step 38 to be dropped, providing an updated set of data points which are then used in step 40 to calculate a moving average baseline value based on the last 20 minutes of data (120 data points/6 data points per minute). This moving average or baseline is used to detect spikes elsewhere in the algorithm.

Every 80 milliseconds, the signal measured at step 33 is compared in step 44 to the moving average baseline value calculated in step 40. A "spike" event is deemed to have begun whenever the measured signal is 15% or more above the moving baseline (the "trigger value"), and deemed to have ended when the signal drops below the trigger value. Thus, when a signal exceeds the trigger value, a spike detection flag is set to "on" in step 46, a scan counter is incremented in step 48, and the spike integrated to determine its total area in step 50.

If the measured spike magnitude does not exceed the maximum spike magnitude, this branch of the algorithm terminates at step 54. If, however, the spike is greater in magnitude than the maximum spike magnitude stored in step 52, the maximum spike magnitude is set to the measured value and this branch of the algorithm terminates at step 54.

Data from steps 48, 50 and 52 is used in steps 58 and 60 to calculate and store data related to the presence of spikes, their duration, size and magnitude. This information is used by spike summary algorithm 32 as described below.

In spike summary algorithm 32, spike minute summary counters are updated every second in step 62 to reflect the latest moving values of spikes, their duration, size and magnitude. These values are stored each minute in step 64, and used in step 68 to calculate 60 minute running average values of spikes, spike duration, spike size and spike magnitude. The values are historized in step 70 to provide a record of the 60 minute moving averages useful for evaluating the performance of the present invention.

If desired, the algorithm described above could be altered to include a moving average baseline having a total elapsed period of time which is varied in response to the type or number of transients observed. For example, if the monitored signal was that of the motor current sent to a pump used to transfer viscoelastic fluid such as a polymer melt, and if the observed transients varied in width (i.e., time) as a function of melt temperature, the program could include a step to increase sample frequency during periods of relatively shorter transients, and to decrease sample frequency when relatively longer transients are present. If necessary, such a subroutine could include a constraint or filter to ensure that low frequency changes associated with normal process control would not be confused with longer duration transients.

The foregoing algorithm and its set points and time period are intended to be exemplary only. Any program or instrument capable of detecting the presence of transients on a low frequency control signal may be used in our invention. The only requirement is that the program or instrument has a sufficiently rapid response to detect the transient. The program or instrument could respond only to spike amplitude, or area, or total spike area per unit time, for example, as is deemed appropriate under the given circumstances by those of ordinary skill in the art of control systems.

Various manual control actions can be taken in the foregoing example to reduce the production of strings and lumps in response to the occurrence or increase in the number or magnitude of spikes. Such actions are well-known to those skilled in the art and include, for example, changes in catalyst feed, cocatalyst feed, electron donor feed, monomer feed, hydrogen feed, comonomer feed, catalyst to cocatalyst ratio, catalyst activity control agent feed, reactor quench flow, reactor powder inventory, mixing, reactor temperature and pressure, whether controlled directly, or by altering one or more of the foregoing parameters, and combinations of the foregoing. General information related to the operation and control of propylene polymerization processes which may be useful in connection with implementation of our invention can be found in the "Propylene Handbook", edited by Edward P. Moore, published by Hanser/Gardner Publications, Inc., Cincinnati, Ohio (1996), the disclosure of which is hereby incorporated by reference. For example, a list of catalyst poisons, which might be used as catalyst activity control agents, is provided on page 299.

The desirability of these control actions would not have been apparent but for the early indication of nonhomogeneous powder obtained by monitoring the powder feeder motor amperage.

In the foregoing examples, it should be noted that either rotary feeder 16 or 20, or both, might be used to provide transient information. In some cases, a combination of transients may provide a more certain indication of the need for upstream process control. Use of multiple transient sources from the same or different pieces of process equipment is, of course, within the scope of our invention.

While our invention has been described in connection with the manufacture of polypropylene powders in a stirred, gas phase, subfluidized bed reactor system, the same concept can be applied to any chemical manufacturing process used to make a solid or viscoelastic fluid. The only requirement is that signals associated with downstream equipment can be monitored to reveal transients which can be correlated with changes in the nature of the material that is being produced. For example, the invention may be used in connection with fluidized bed reactors that produce polypropylene or polyethylene powders in a manner very similar to that already described. The invention may also be used with liquid stirred tank reactors or slurry reactors designed to ultimately yield a powder, even though the powders produced must first be isolated from a slurry or solution prior to powder handling. Other examples include, but are not limited to, monitoring of signals from various waste stream or recycle equipment used to handle process fluids, without regard for whether the desired chemical end product is a solid, liquid or gas, the only requirement being that an undesired material quality generates transients that can be associated with that undesired quality, and that the transients associated with the downstream process equipment signals can be observed.

We believe it is possible to monitor high frequency transients on most types of downstream equipment or process instrumentation to control upstream equipment and improve product quality in a manner consistent with that described in detail above. Electrical current, voltage or frequency signals, hydraulic pressure signals or pneumatic pressure signals are preferred signals to monitor for transients as these signals frequently will exhibit transients of the type that can be correlated to subtle changes in product quality, and therefore provide early indication of the need for changing the operating conditions of upstream equipment, and in particular conditions associated with a chemical reactor. In this regard it should be noted that while there may be existing alarms or monitors installed in connection with downstream process equipment of operational significance, signals of a magnitude sufficient to trigger such alarms or otherwise result in a substantial, direct alteration of control of the downstream equipment are larger than those considered to be transients, as defined in connection with this invention. In fact, it typically will be necessary to install new equipment or modify existing equipment to be able to detect the subtle transients indicative of early changes in material qualities that are not within the natural range of control of the downstream equipment, or too fast to be detected by the installed downstream control equipment.

Thus, a "transient" as used in this invention, means a high-frequency spike superimposed on and appearing above or below (i.e. a positive or negative offset from) a low frequency signal such as a motor current control signal. In preferred embodiments, the transient or transients will be such that their cumulative effect on the direct control of the downstream process equipment will be negligible. Spikes that initiate alarms or shutdown equipment have too large a magnitude to be considered as transients useful for control of upstream equipment in accordance with those preferred embodiments of our invention.

Oftentimes, it will be preferred to use a plurality of transients as the event that triggers a process control change, in which case the group of transients is referred to as "series" of transients. If a transient or series of transients is measured relative to a moving average baseline representing the low frequency variation of the monitored signal, such transient or series of transients are referred to as a "moving average baseline transient" or a "series of moving averaged baseline transients." Once the proper equipment is in place to identify the transients present in equipment signals, it is only necessary to compare the observed transients to stable and undesired operating conditions and corresponding material quality to determine which transients provide information useful for implementing process control steps in accordance with our invention.

As another example, in a propylene polymerization process, pressure spikes at the suction of an extruder gear pump may correlate to poor control of the powder feed to the extruder, or to the collection of unmelted polymer at the screen pack (located between the extruder and the die pump). Monitoring of the extruder gear pump therefore could be used to indicate the desirability of a change in process variables upstream of the extruder to improve powder feed or minimize the formation of materials that would plug the screen pack. It should be noted that a process control change to any equipment upstream from the extruder (i.e., any upstream equipment, not just the reactor) that will improve material quality or performance at the downstream location is within the scope of our invention.

In another example, monitoring of pressure spikes appearing on the discharge of a polymer pellet water pump could be related to poor pelletization at the extruder die plate or fouling of a transfer line. These indications could be used to control process variables related to the extruder, and can otherwise assist in trouble-shooting, increase production rate, reduce downtime and maintenance, and increase prime production.

The monitoring of downstream equipment responses that are not direct measurements of the chemical or physical parameters to infer the need for early process control such as those described above can be integrated into reactor control equipment to form a closed loop reactor control system. The magnitude of the responses required can be determined empirically or through the use of computer software that is capable of accumulating data sets directly or through parameter estimation and thereafter determining an optimal response given the particular pattern of transients observed. Software useful for the control of chemical processes which may incorporate inferential inputs from downstream equipment is available from vendors such as Pavilion Technologies, Inc. of Austin, Tex. or can otherwise be obtained or written by those skilled in the art of control systems.

The foregoing detailed description focused on a specific example of how a powder feeder motor control may be monitored to provide information useful for upstream reactor system control. Those skilled in the control art, however, will realize after reviewing our disclosure that virtually any downstream equipment having an associated low frequency signal that can be analyzed for the presence of high frequency transients can provide a sensitive indication of changes in chemical reactor or other upstream equipment performance, and can, therefore, be utilized in accordance with the invention. Our invention therefore is intended to be limited only by the following claims.

We claim:

1. A method for controlling a chemical manufacturing process comprising the steps of:
   monitoring a signal associated with downstream process equipment to detect transients present in the signal;
   inferring a change in product quality associated with the detected transients; and
   adjusting a process parameter associated with upstream equipment in response to the inferred change in product quality.

2. The method of claim 1 wherein the process parameter used to control upstream equipment is a parameter used to control the quality of a solid or a viscoelastic fluid.

3. The method of claim 1 wherein the monitored signal is selected from the group consisting of electrical current, voltage or frequency signals, hydraulic pressure signals or pneumatic pressure signals.

4. The method of claim 1 wherein the upstream equipment is a chemical reactor used to manufacture a polymeric material.

5. The method of claim 4 wherein the chemical reactor is used to manufacture a polymeric powder, where the monitored signal of downstream equipment is associated with the motor current of powder handling equipment, and the product quality inferred from the observed transients is the presence of aggregated polymeric powder having a size greater than that nominally produced by the reactor under routine reactor operating conditions.

6. The method of claim 5 wherein the polymeric powder is polyethylene or polypropylene.

7. The method of claim 6 wherein the upstream equipment is a chemical reactor and the process parameter associated with upstream equipment is selected from the group consisting of catalyst feed, cocatalyst feed, electron donor feed, monomer feed, hydrogen feed, comonomer feed, catalyst to cocatalyst ratio, catalyst activity control agent feed, reactor quench flow, reactor mixing or fluidization reactor powder inventory, reactor temperature, and reactor pressure, and combinations thereof.

8. The method of claim 1 wherein the performance parameter observed is associated with powder handling equipment.

9. The method of claim 1 wherein the upstream equipment is a chemical reactor and the adjusted process parameter associated with the upstream equipment is selected from the group consisting of catalyst feed, cocatalyst feed, electron donor feed, monomer feed, hydrogen feed, comonomer feed, catalyst to cocatalyst ratio, catalyst activity control agent feed, reactor quench flow, reactor mixing or fluidization, reactor powder inventory, reactor temperature, reactor pressure, and combinations thereof.

10. The method of claim 1 wherein the monitoring step includes the steps of:
   periodically monitoring the signal to establish a baseline indicative of nominal process performance; and thereafter
   periodically observing the signal to detect one or more transients above or below the baseline that infer a change in quality of material produced in the chemical manufacturing process; and
   initiating a process control step in upstream equipment in response to one or more of the transients.

11. The method of claim 10 wherein data points obtained in the periodic monitoring step are used to construct a moving average baseline.

12. The process of claim 11 wherein a period of time over which the moving average baseline is determined is varied in response to the type or number of transients observed.

13. The method of claim 10 further including a filtering step in which data attributable to known events not related to process material quality deviations is not used in determining the baseline.

14. A method for controlling the manufacture of polyolefin powder in a polyolefin manufacturing process including a reactor used for the polymerization of the olefin comprising the steps of:
   monitoring a signal associated with operation of process equipment for powder handling located downstream of a polyolefin reactor to detect transients present in the signal;
   inferring the presence in the process stream of undesired large particles in powder size from the presence of the transient.

15. The method of claim 14 further including the steps of adjusting a process parameter associated with the reactor to reduce the presence of the undesired large particles.

16. The method of claim 15 wherein the adjusted process parameter is selected from the group consisting of adjusting catalyst feed, cocatalyst feed, electron donor feed, monomer feed, hydrogen feed, comonomer feed, catalyst to cocatalyst ratio, catalyst activity control agent feed, reactor mixing or fluidization, reactor quench flow, reactor powder inventory, reactor temperature, and reactor pressure, and combinations thereof.

17. The method of claim 14 wherein the powder handling equipment is a rotary powder feeder.

18. The method of claim 14 wherein the monitored signal is selected from the group consisting of electrical current, voltage or frequency signals, hydraulic pressure signals or pneumatic pressure signals used to control the powder handling equipment.

19. The method of claim 14 wherein the monitoring step includes the steps of:
   periodically monitoring the signal to establish a baseline indicative of nominal powder size;
   periodically testing the powder handling equipment signal to determine transient events above the baseline and;
   initiating a process control step in response to one or more of the transient events.

20. The process of claim 14 wherein the conversion of an olefin feedstock to polyolefin powder occurs at least in part in a gaseous phase within the reactor.

21. A method for controlling the manufacture of polypropylene powder in a polypropylene manufacturing process including a reactor used for the polymerization of propylene comprising the steps of:
   monitoring a signal associated with operation of downstream process equipment for powder handling to detect transients present in the signal;
   inferring the presence of undesired large particles from the presence of the transients; and
   adjusting a process parameter associated with an upstream reactor selected from the group consisting of adjusting stirring speed, catalyst feed, cocatalyst feed, electron donor feed, monomer feed, hydrogen feed, comonomer feed, catalyst to cocatalyst ratio, catalyst activity control agent feed, reactor quench flow, reactor powder inventory, reactor temperature, and reactor pressure, and combinations thereof in response to the inferred presence of large particles.

22. A method for controlling the manufacture of polypropylene powder in a polypropylene manufacturing process including a reactor used for the polymerization of propylene, the process comprising the steps of:
   reacting propylene monomer in a fluidized bed reactor;
   monitoring a signal associated with the operation of downstream process equipment for powder handling to detect a transient present in the signal;
   inferring the presence of undesired large particles from the presence of the transient; and
   adjusting a process parameter associated with the reactor selected from the group consisting of stirring speed, catalyst feed, co-catalyst feed, electron donor feed, monomer feed, hydrogen feed, co-monomer feed, catalyst to co-catalyst ratio, catalyst activity control agent feed, reactor quench flow, reactor powder inventory, reactor temperature, reactor pressure, flow of fluidization gases into the reactor, and combinations thereof in response to the inferred presence of large particles.

23. The method of claim 22 wherein an adjusted process parameter is flow of fluidization gases into the reactor.

24. A method for controlling the manufacture of polypropylene powder in a polypropylene manufacturing process including a reactor used for the polymerization of propylene, the process comprising the steps of:
   reacting propylene monomer in a horizontal stirred subfluidized bed reactor;
   monitoring a signal associated with the operation of downstream process equipment for powder handling to detect a transient present in the signal;
   inferring the presence of undesired large particles from the presence of the transient; and
   adjusting a process parameter associated with the reactor selected from the group consisting of adjusting stirring speed, catalyst feed, co-catalyst feed, electron donor feed, monomer feed, hydrogen feed, co-monomer feed, catalyst to co-catalyst ratio, catalyst activity control agent feed, reactor quench flow, reactor powder inventory, reactor temperature, reactor pressure, reactor stirring speed, and combinations thereof in response to the inferred presence of large particles.

25. The method of claim 24 wherein an adjusted process parameter is reactor stirring speed.

* * * * *